INVENTORS
Donald Theodore Bray
Castle O. Reiser
BY Gruhwells
Atty.

United States Patent Office 2,694,681
Patented Nov. 16, 1954

2,694,681

RECYCLING THE COMPLEXING AGENT IN THE SEPARATION OF IONS BY ION EXCHANGE

Donald Theodore Bray, Idaho Falls, and Castle O. Reiser, Moscow, Idaho, assignors to University of Idaho Research Foundation Inc., Moscow, Idaho, a corporation of Idaho Application March 7, 1952, Serial No. 275,376

1 Claim. (Cl. 210—24)

Our invention relates to a method of separating ions by ion exchange. It is particularly directed to a method whereby the ions first collected on an ion exchange bed are preferentially desorbed by a solvent or complexing agent which is segregated upon leaving the ion exchange bed into fractions in which different ions predominate. The complexing agent fractions are then individually treated to take out the ions.

It is the principal purpose of our invention to provide a novel method of extracting ions from an ion exchange bed whereby the ions that are adsorbed on an ion exchange bed are first preferentially desorbed from the bed by a solvent or complexing agent flowing through the bed and separate fractions of the solvent with the ions therein are so treated that they are caused to give up the ions therein and the solvent is recovered, free of deleterious contamination and is again brought to its original condition and used over and over in succeeding preferential desorption of ions from the main ion exchange bed.

The nature and advantages of the invention will appear more fully from the following detailed description and the accompanying drawings wherein.

Figure 1:
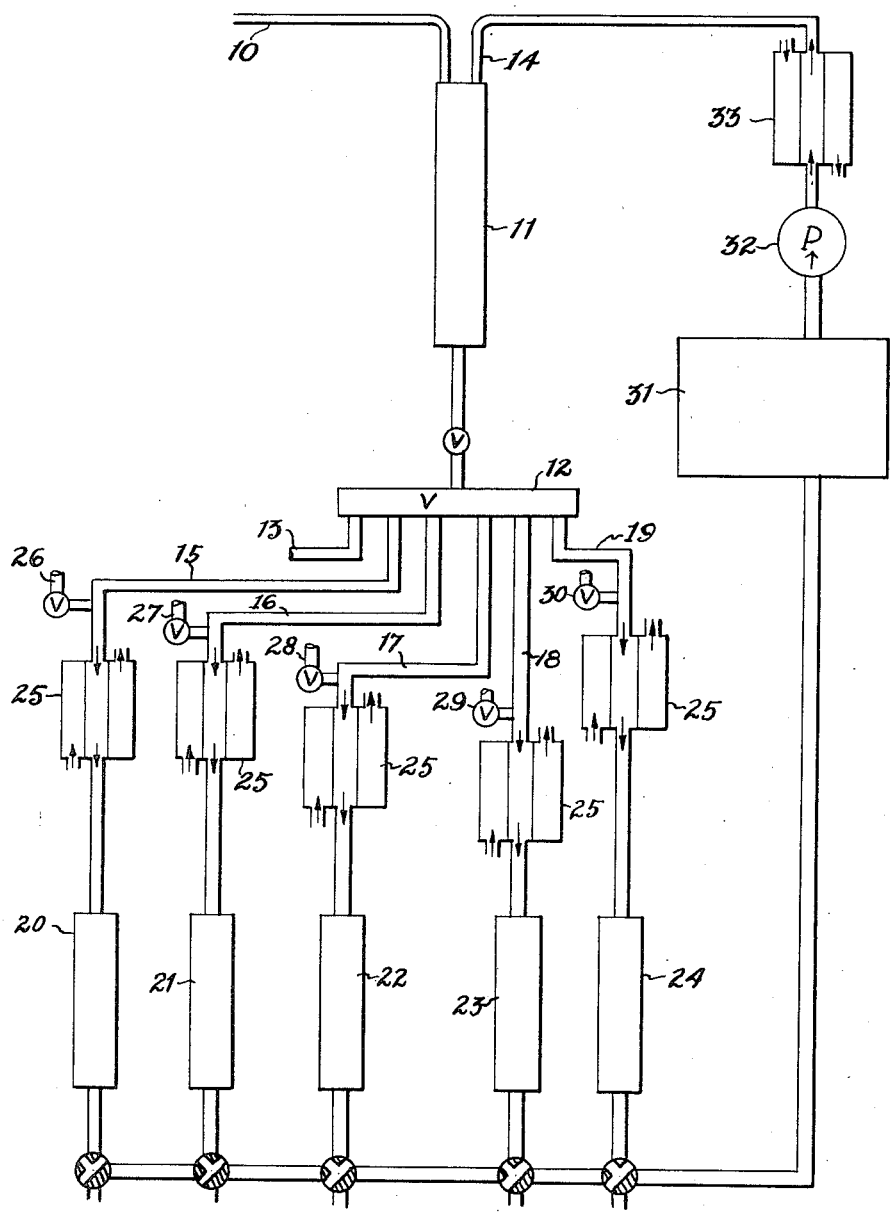
Figure 1 is a flow sheet diagram illustrating the sequence of steps in the present method.

Ion exchange separation is initially accomplished by flowing a solution of the materials to be separated through an exchange bed where the ions or materials to be separated are adsorbed by the exchange material. This exchange material is usually an organic resin. As illustrated on the flow sheet of Figure 1 a solution of the materials to be separated is first passed downwardly from an inlet conduit 10 through an ion exchange column 11 which contains the ion exchange resin. The ions to be recovered and separated are adsorbed on the resin in the column 11 and the solution is drained off through a distributing valve 12 at the outlet 13. It is desirable to then wash the ion exchange column 11 to remove the solvent of the first solution.

A preferential desorbing solution is next run through the ion exchange column 11 from the inlet 14. This preferential desorbing solution is generally termed a complexing agent and it is prepared to have a different desorbing capacity for each of the materials that have been deposited on the ion exchange bed. As this complexing agent flows down through the column 11, it will first desorb from the ion exchange bed the ions for which it has the greatest affinity so that the initial down flow to the valve 12 will contain predominately these particular ions. A distributing valve 12 is adjusted to direct the initial flow through an outlet 15. As the flow of the complexing agent continues through the column 11, the valve 12 is shifted to next direct the flow through an outlet 16 then through outlet 17 and to outlets 18 and 19. The fraction of the complexing agent directed through the outlet 15 is conducted to another ion exchange column 20. The fraction directed to the outlet 16 is conducted to an ion exchange column 21. The fraction drawn off through the outlet 17 is conducted to an ion exchange column 22, the fraction drawn off at 18 is conducted to an ion exchange column 23 and the fraction drawn off at 19 is conducted to an ion exchange column 24.

The number of fractions collected in this fashion may be varied to suit the particular materials. As an example, the ions deposited in the ion exchange column 11 may be of three or more materials, A, B and C. When the solution containing a complexing agent which forms complexes with the ions A, B and C, is passing down through the column 11, the complexes have different properties and tend to move down the column 11 at different rates. When the solution is eluted from the column 11, those fractions containing mostly ion A will flow down through the column 11 first so that when the solution is drawn off through outlet 15, it will contain mostly ion A. The distributing valve 12 is shifted at the proper time to conduct a second fraction through the outlet 16. The second fraction will contain a mixture of ion A and B but after this fraction is drawn off a third fraction is drawn off through the outlet 17 and this fraction contains mostly ion B. Additional fractions comprising mixtures of ion B and C and containing mostly ion C can be drawn off through outlet 18 and additional outlets where such are needed.

The complexing agent fraction containing mostly ion A is directed to a second ion exchange bed in the column 20. In accordance with our invention the characteristics of this fraction may be changed so as to cause the complexing agent to give up the ions A to the ion exchange resin bed in column 20. The change can be brought about by one or more methods or by a combination of these methods. For example, an increase in the temperature of the complexing agent fraction and of the ion exchange bed has been found by experiment to change the relative affinity of the complexing agent and the ion exchange bed for the metal ions. A change in the pH of the complexing agent solution after it leaves the column 11 and before it reaches the column 20, will result in changing the affinity of the solution for the ions. This may be used to cause the resin bed in the column 20 to collect ions from the complexing agent. There is an optimum pH of the complexing agent for which the resin will have a maximum capacity to remove ions from the complexing agent so it is essential to start the complexing agent through the ion exchange column 11 at a pH which is somewhat higher or lower than the optimum pH in order that the pH may be brought closer to the optimum in the column 20 to cause the complexing agent to give up its ions to the resin bed in the column 20. It is also a fact that the lowering of the concentration of the complexing agent by dilution will cause the ions to be more firmly bound to the exchange resin. Therefore if the complexing agent is diluted as it passes into the outlet 15, it is possible to have the ion exchange resin in the column 20 adsorb ions from the complexing agent even though the resin employed in the column 20 is the same as that employed in the column 11.

Different types of resins have different capacities to hold the ion under any given set of conditions of the complexing agent-ion solution. It is therefore possible to use in column 20 a resin having a greater capacity for the ions to be collected than the resin used in the column 11. By selecting the proper variations of temperature, pH, and concentration of the complexing agent in each of the fractions drawn off through the outlets 15 to 19 and by utilizing the proper resin for exchange beds in the columns 20–24, the ions removed from the exchange column with the complexing agent solution can be removed from the complexing agent in the exchange beds of columns 20–24. By following our method as outlined hereinbefore the complexing agent can be collected from the several exchange columns 20–24 and recycled through the exchange bed 11 with minor adjustments as to concentrations and pH without any appreciable loss. Contamination of the complexing agent is substantially avoided by following our method since no foreign contaminating materials adversely affecting the utility of the complexing agent need be employed.

Figure 1 shows diagrammatically the necessary equipment for varying the complexing agent characteristics between the outlet from the ion exchange column 11 and the inlets of the several ion exchange columns 20–24.

Heat exchangers 25 are provided in the outlets 15, 16, 17, 18 and 19. Also valved conduits 26, 27, 28, 29, and 30 are provided for admitting water for dilution of the complexing agent or for admitting a material for changing the pH of the complexing agent.

A specific example of the application of our invention to a particular problem of separation of materials is the separation of the rare earth metals occurring in monazite. The monazite is first dissolved in concentrated sulfuric acid. After filtering, this solution is diluted to cause thorium to precipitate out. The solution is filtered again and then it is passed to an ion exchange bed 11 where the rare earth metals remaining are absorbed. A suitable resin for the bed 11 is a synthetic organic cation exchange resin such as that sold under the designation IR–120. The resin IR–120 is a di-vinyl benzine polystyrene copolymer which has a high capacity as a cation exchanger. Other known examples of suitable cation exchange resins are those set forth in U. S. Letters Patent No. 2,539,282. The particular cation exchange resin used is not of importance to the present invention. It is desirable to purify the solution before passing it through the bed 11 by using a precipitating agent such as oxalic acid and re-dissolving the precipitate with a mineral acid. We have used hydrochloric acid to re-dissolve the precipitate and then adjusted the pH to above 2.0. The solution is then passed down through the exchange bed 11 which absorbs the ions of the rare earth elements from the hydrochloric acid solution. The solution is drained off through the outlet 13.

After the hydrochloric acid is run through the exchange column 11, the residual hydrochloric acid is removed by washing the bed with distilled water which is removed at 13. A .5% citric acid solution in water buffered with ammonia to the desired pH, in this case about 4.5 is provided in a supply tank 31 and is pumped by means of a pump 32 into the ion exchange bed 11. The temperature of the bed 11 is held at about 50 degrees C. The initial fraction of this complexing agent which passes down through the column 11 is directed to a second exchange bed 20 and consists essentially of the complexing agent and ions of the rare earth samarium. A second fraction of complexing agent and ions is separately drawn off and run through a second exchange column 21 using the same resin that is used in the bed 11. This second fraction is found to contain predominantly the ions of rare earth neodymium. Additional fractions are drawn off and run through ion exchange beds 22, 23 and 24 to obtain ions predominantly of the rare earths praseodymium, cerium and lanthanum in the cerium group. The several fractions of complexing agent and metal ions are heated or cooled, depending on the metal ion, before being delivered to their respective exchange beds 20, 21, 22, 23 and 24, to a desired temperature. The fraction going to bed 20 is cooled to 20 degrees C. The fractions going to the beds 21, 22, 23 and 24 are heated to about 80 degrees C. The temperature change has the effect of changing the relative affinities of the complexing agent and the exchange bed resin for the metal ions so that the resin holds the metal ions on the beds 20–24 and the complexing agent gives up the metal ions. The effluent from the exchange beds 20–24 is collected again in the supply tank 31 and is adjusted for temperature at 33 before being recycled through the exchange bed 11. The effect of temperature change on the relative affinities of the complexing agent and the exchange bed resin for the ions of the several rare earth metals is illustrated in Figure 2 of the drawings.

Figure 2:
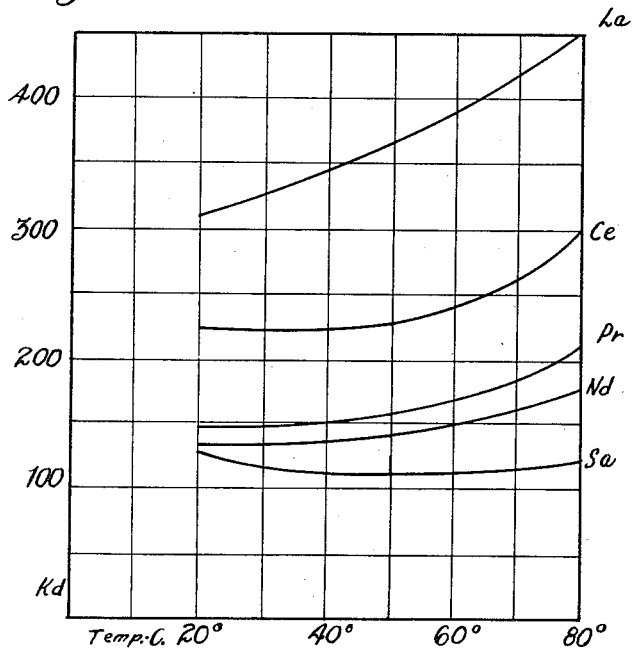
Figures 2, 3 and 4 are graphs illustrating the effect of temperature and ion concentration (pH) upon the distribution of metal ions between an exchange bed resin and the solvent or complexing agent solution.

Referring now to the graph of Figure 2, the change in temperature is indicated in the horizontal direction. The indications in a vertical direction are measured by the distribution coefficient $Kd$. This distribution coefficient is defined as the relation of the amount of ions held on an ion exchange resin bed per unit mass of resin to the amount of ions held in solution by the complexing agent per unit volume of complexing agent.

The graph of Figure 2 shows that the coefficient $Kd$ for samarium with the citric acid complexing agent of 4.5 pH and the ion exchange resin referred to above, decreases with temperature rise from 20 degrees C. to 50 degrees C. and then increases slowly with further temperature rise to 80 degrees C. It is better therefore to cool the samarium fraction from 50 degrees C. to 20 degrees C. than to heat it to 80 degrees C. With the neodymium, praseodymium, cerium and lanthanum fractions there is an obvious advantage in heating to increase the distribution coefficient $Kd$. With any particular metal ion, complexing agent and resin bed it may be necessary to heat or cool the fractions in order to cause the complexing agent to give the ions back to an exchange bed resin. However, this does not interfere with the recycling process.

Figure 3:
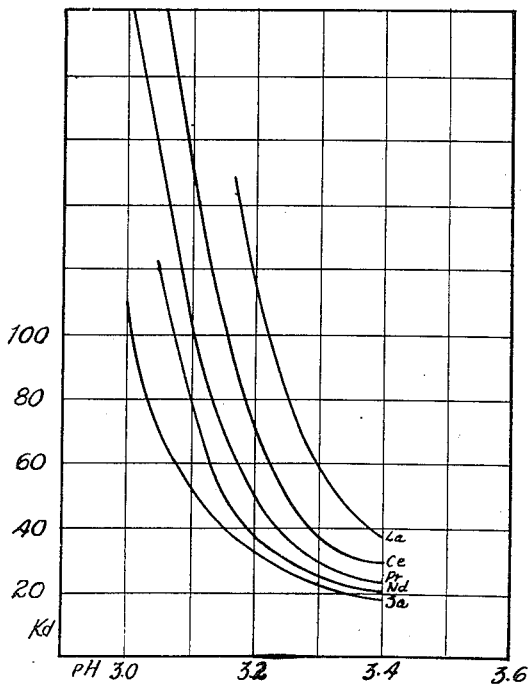

Another example of our process is as follows:

Using a 5% citric acid solution as the complexing agent to extract the metal ions from the ion exchange bed 11 where the same rare earth metal ions have been deposited in the same manner as in the previous example, the pH of the solution used being initially 3.4, we draw off the several fractions in the same way as before. Each fraction is then treated, for example by adding citric acid, to lower its pH to 3.2. The lowering of the pH has the effect, as indicated graphically in Figure 3, of increasing the distribution coefficient $Kd$ for the several rare earth metals. The complexing agent in the several fractions gives up its ions to the beds 20–24 and is returned to the storage tank 31. The pH of the complexing agent is then readjusted to the higher value before it is recycled through the exchange bed 11.

Figure 4:
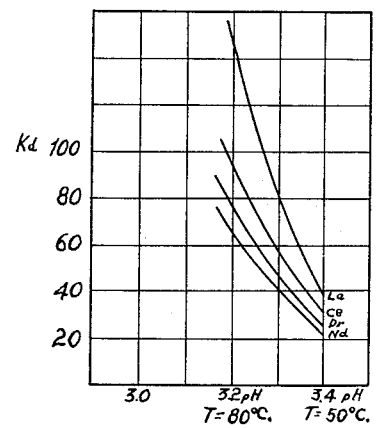

Greater variations in the $Kd$ value between the main ion exchange bed 11 and the individual beds can be obtained by combining the temperature change and pH change in one operation. Figure 4 illustrates the results of such combination.

Figure 5:
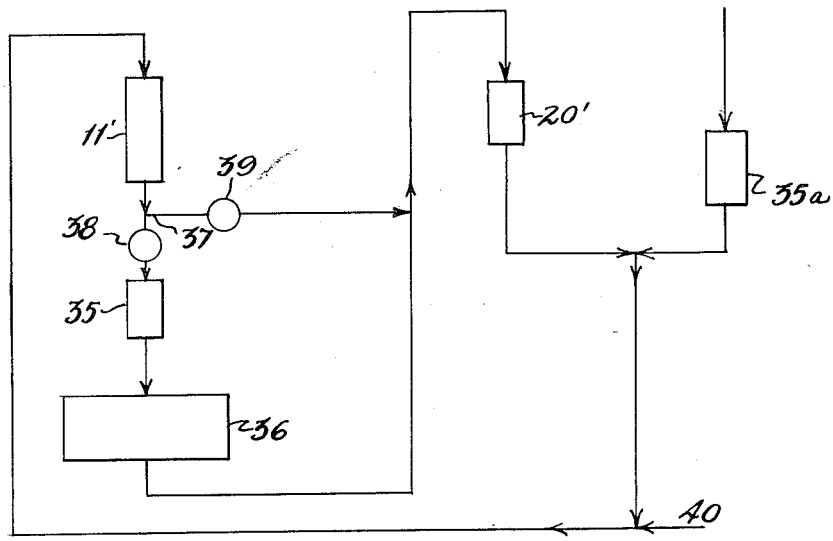
Figure 5 is a flow sheet illustrating a modification of the method illustrated by Figure 1.

Even greater increases in the coefficient $Kd$ may be obtained by lowering the ion concentration of the complexing agent after the complexing agent has extracted the ions from the main ion exchange bed 11 and before the fractions of complexing agent and ions have reached the beds 20–24. In Figure 5 we illustrate this method.

In Figure 5 the ions collected on the main ion exchange bed 11' are eluted by a complexing agent, such as a 5% citric acid solution having a pH of 3. A portion of this solution is then diverted to an anion exchange bed 35 using any suitable anion exchange resin which will remove citric acid from the solution. The weaker citric acid solution with the metal ions in it is collected in a tank 36 after passing through the bed 35. The anion exchange bed 35 is removed after being charged with the citric acid ions and must be placed in a regenerating cycle to recover the citric acid. In Figure 5 one bed 35 is in the separation cycle and another bed 35a is in the regenerating cycle. The weaker complexing agent with the metal ions is mingled with the remainder of the eluant solution from the bed 11' that was by-passed at 37. Valves 38 and 39 control the amount of eluant bypassed. The combined eluant is then passed through the recovery ion exchange bed 20' where the selected metal ions are deposited. The complexing agent from the bed 20' is then mingled with the citric acid recovered from the exchange bed 35a in the regenerating cycle. Any necessary make-up citric acid is added at 40 to bring the complexing agent back to its original concentration.

The regeneration is accomplished at 35a by passing an anion solution such as sulfuric acid through the bed 35a. This results in the sulfate ions replacing the citrate ions in the bed 35a and release of the citric acid. The bed 35a can be made ready for use again by exhausting the sulfuric acid ions with soda ash and washing with water.

Figure 6:
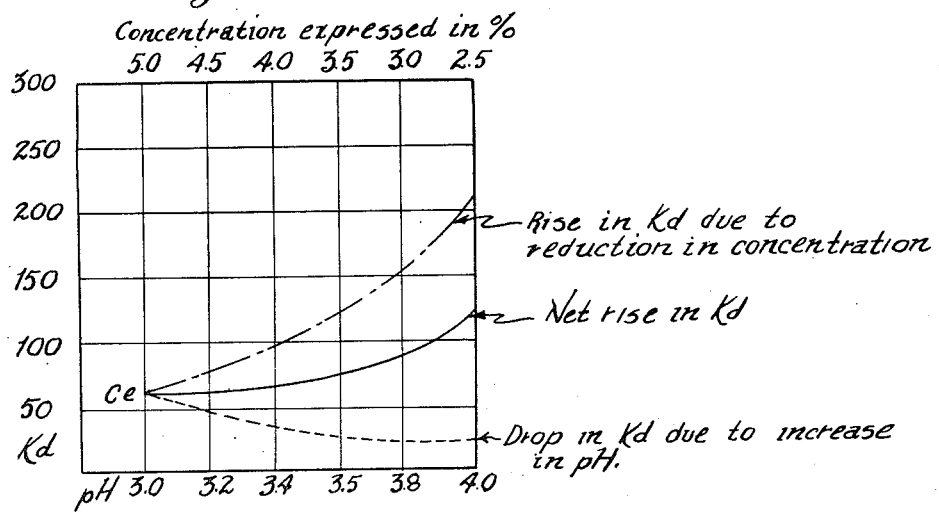
Figure 6 is a graph showing the effects of carrying out the modified method of Figure 5.

The results of removing part of the citric acid between the exchange bed 11' and the exchange bed 20' are increased pH and reduced acid concentration at the bed 20'. The reduction in concentration of acid has more effect on the coefficient $Kd$ than does the rise in pH. This is illustrated by the graph of Figure 6 where the net results are in terms of pH and acid concentration with a fraction of complexing agent containing cerium ions.

The foregoing disclosure is believed to be sufficient to show how the object of our invention is attained. The essential steps of the method comprise in each example the initial selective removal of the deposited ions from an ion exchange bed by a solution of a complexing agent such as citric acid, the subsequent treatment of the solution decreasing its relative affinity (when compared with the exchange bed resin) for the selected ions in the fractions of solution recovered without contamination passing the fractions so changed through a second ion exchange bed, depositing the ions therein and thereafter increasing the affinity of the complexing agent solution for the ions by the reverse of the treatment initially employed and recycling the complexing agent.

The relatively large quantities of complexing agent needed for the selective recovery of the rare earth metals such as those described herein would make the cost of recovery prohibitive. By the application of our method the complexing agent is used repeatedly. The losses to be made up are relatively small.

It is believed that the nature and advantages of our invention will be apparent from the foregoing description.

We claim:

The method of selective separation of ions which comprises the steps of first collecting a mixture of ions to be separated from a solution thereof by adsorbing the ions from a solution on a main ion exchange bed, then desorbing the ions from said bed by passing through the bed a complexing agent capable of preferentially desorbing the various ions from the bed, separating the effluent of complexing agent and ions into fractions in which different ions desorbed from the main bed are concentrated because of the preferential desorbing action of the complexing agent, then in each fraction, reducing the holding capacity of the complexing agent for the ions therein by heat and dilution, and passing each fraction so treated through an individual ion exchange bed and thereby adsorbing the ions from the complexing agent, then cooling and concentrating the effluents, from the individual ion exchange bed to the original temperature and concentration of complexing agent for further desorbtion of ions from the main exchange bed.

References Cited in the file of this patent

UNITED STATES PATENTS

| Number | Name | Date |
|---|---|---|
| 2,539,282 | Spedding et al. | Jan. 23, 1951 |
| 2,546,953 | Street, Jr. | Mar. 27, 1951 |
| 2,571,237 | Hansen | Oct. 16, 1951 |